(12) United States Patent
Grünschloß et al.

(10) Patent No.: US 8,131,770 B2
(45) Date of Patent: Mar. 6, 2012

(54) SYSTEM, METHOD, AND COMPUTER PROGRAM PRODUCT FOR IMPORTANCE SAMPLING OF PARTITIONED DOMAINS

(75) Inventors: Leonhard Grünschloß, Berlin (DE); Matthias Raab, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 391 days.

(21) Appl. No.: 12/363,506

(22) Filed: Jan. 30, 2009

(65) Prior Publication Data

US 2010/0198877 A1  Aug. 5, 2010

(51) Int. Cl.
G06F 17/30 (2006.01)
(52) U.S. Cl. ............................................ 707/797; 380/28
(58) Field of Classification Search .................. None
See application file for complete search history.

(56) References Cited

U.S. PATENT DOCUMENTS

| | | | |
|---|---|---|---|
| 7,020,698 B2 * | 3/2006 | Andrews et al. | 709/223 |
| 7,274,671 B2 * | 9/2007 | Hu | 370/256 |
| 7,298,303 B2 * | 11/2007 | Kobayashi et al. | 341/107 |
| 7,952,583 B2 * | 5/2011 | Waechter et al. | 345/426 |
| 2002/0176494 A1* | 11/2002 | Zhao et al. | 375/240 |
| 2008/0273693 A1* | 11/2008 | Au et al. | 380/28 |
| 2009/0112865 A1* | 4/2009 | Vee et al. | 707/7 |
| 2009/0202155 A1 | 8/2009 | Hayashi et al. | |
| 2010/0205181 A1* | 8/2010 | Chidlovskii | 707/741 |

FOREIGN PATENT DOCUMENTS

| | | | |
|---|---|---|---|
| JP | 8294142 A | 11/1996 | |
| JP | 2001067492 A | 3/2001 | |
| JP | 2003263651 A | 9/2003 | |
| WO | 9941704 A1 | 8/1999 | |
| WO | 0055814 A2 | 9/2000 | |
| WO | 02099754 A1 | 12/2002 | |
| WO | 2007022439 A2 | 2/2007 | |
| WO | 2008022173 A2 | 2/2008 | |
| WO | 2008138810 A1 | 11/2008 | |

OTHER PUBLICATIONS

German Office Action from Application No. 102010001052.9 dated Feb. 14, 2011.
Korean Office Action from Application No. 10-2010-8765 dated Apr. 12, 2011.
Quennesson et al., "Rao-Blackwellized Importance Sampling of Camera Parameters from Simple User Input with Visibility Preprocessing in Line Space", Jun. 2006, pp. 1-7, Proceedings of the Third International Symposium on 3D Data Processing, Visualization and Transmission (3DPVT 2006), Chapel Hill, NC.
Agarwal et al., "Structured Importance Sampling of Environment Maps", Jul. 2003, pp. 605-612, vol. 22, Issue 3, ACM Transactions on Graphics (TOG)—Proceedings of ACM SIGGRAPH 2003, New York, NY.
Notice of Reasons for Rejection from Japanese Patent Application No. 2009-254313 dated Sep. 6, 2011.
Stephenson, Ian., "Production Rendering: Design and Implementation," Springer, 2005.

(Continued)

*Primary Examiner* — Debbie Le
(74) *Attorney, Agent, or Firm* — Zilka-Kotab, PC

(57) ABSTRACT

A system, method, and computer program product are provided for importance sampling of partitioned domains. In operation, a domain is partitioned into a plurality of sets. Additionally, a probability is assigned to each of the plurality of sets. Furthermore, samples are generated from the plurality of sets, the samples being generated according to the probability of a corresponding set.

21 Claims, 8 Drawing Sheets

OTHER PUBLICATIONS

Cormen, Thomas H. et al., "Introduction to Algorithms," The MIT Press, Second Edition, 2004.

U.S. Appl. No. 12/241,928, filed Sep. 30, 2008.

P. Clarberg, W. Jarosz, T. Akenine-Moller, and H. Wann Jensen. Wavelet importance sampling: Efficiently evaluating products of complex functions. ACM Transactions on Graphics, 24(3):1166-1175, 2005.

F. Crow. Summed-area tables for texture mapping. In SIGGRAPH '84: Proceedings of the 11th annual conference on Computer graphics and interactive techniques, pp. 207-212, New York, NY, USA, 1984. ACM.

V. Havran. Heuristic Ray Shooting Algorithms. Ph.d. thesis, Department of Computer Science and Engineering, Faculty of Electrical Engineering, Czech Technical University in Prague, Nov. 2000.

J. Hurley, A. Kapustin, A. Reshetov, and A. Soupikov. Fast ray tracing for modern general purpose CPU. In Proceedings of GraphiCon 2002, 2002.

J. Hensley, T. Scheuermann, G. Coombe, M. Singh, and A. Lastra. Fast summed-area table generation and its applications. In Eurographics '05. ACM, ACM Press, 2005.

S. Sengupta, Harris M, Y. Zhang, and J. Owens. Scan primitives for GPU computing. In GH '07: Proceedings of the 22nd ACM SIGGRAPH/Eurographics symposium on Graphics hardware, pp. 97-106, Aire-la-Ville, Switzerland, Switzerland, 2007. Eurographics Association.

J. Stumpfel, C. Tchou, A. Jones, T. Hawkins, A. Wenger, and P. Debevec. Direct HDR capture of the sun and sky. In AFRIGRAPH '04: Proceedings of the 3rd international conference on Computer graphics, virtual reality, visualisation and interaction in Africa, pp. 145-149, New York, NY, USA, 2004. ACM.

Decision to Grant from Japanese Patent Application No. 2009-254313, dated Jan. 10, 2012.

Notice of Final Rejection from Korean Patent Application No. 10-2010-0008765, dated Dec. 21, 2011.

\* cited by examiner

|  | mid-split | mid-split-h. | entr. | entr.-bin. | hybrid | huffman | opt.-kd |
|---|---|---|---|---|---|---|---|
| grace-new | | | | | | | |
| max. leaf depth | 11 | 15 | 17 | 17 | 14 | 22 | 23 |
| avg. leaf depth | 11.000 | 12.072 | 12.502 | 12.500 | 12.149 | 14.645 | 13.061 |
| exp. trav. steps | 11.000 | 5.968 | 5.881 | 6.164 | 5.934 | 4.172 | 5.698 |
| eucalyptus | | | | | | | |
| max. leaf depth | 11 | 14 | 15 | 16 | 14 | 16 | 17 |
| avg. leaf depth | 11.000 | 11.442 | 12.413 | 12.460 | 11.285 | 12.794 | 12.646 |
| exp. trav. steps | 11.000 | 9.943 | 9.457 | 9.459 | 10.519 | 9.285 | 9.331 |
| random | | | | | | | |
| max. leaf depth | 11 | 13 | 14 | 14 | 12 | 20 | 15 |
| avg. leaf depth | 11.000 | 11.062 | 11.122 | 11.122 | 11.002 | 11.490 | 11.232 |
| exp. trav. steps | 11.000 | 10.941 | 10.941 | 10.941 | 10.999 | 10.753 | 10.849 |
| sun | | | | | | | |
| max. leaf depth | 11 | 13 | 18 | 17 | 13 | 14 | 17 |
| avg. leaf depth | 11.000 | 12.009 | 13.002 | 12.836 | 11.765 | 11.646 | 13.112 |
| exp. trav. steps | 11.000 | 4.223 | 4.217 | 5.176 | 4.247 | 1.335 | 4.200 |
| ennis | | | | | | | |
| max. leaf depth | 11 | 14 | 18 | 18 | 18 | 22 | 18 |
| avg. leaf depth | 11.000 | 11.880 | 14.081 | 13.833 | 13.884 | 15.213 | 14.248 |
| exp. trav. steps | 11.000 | 8.320 | 7.165 | 7.215 | 7.205 | 6.959 | 7.120 |
| starfield | | | | | | | |
| max. leaf depth | 11 | 14 | 14 | 14 | 14 | 14 | 13 |
| avg. leaf depth | 11.000 | 11.623 | 11.610 | 11.635 | 11.610 | 13.894 | 11.622 |
| exp. trav. steps | 11.000 | 8.105 | 7.974 | 7.803 | 7.974 | 5.487 | 7.107 |

SYSTEM, METHOD, AND COMPUTER PROGRAM PRODUCT FOR IMPORTANCE SAMPLING OF PARTITIONED DOMAINS

FIELD OF THE INVENTION

The present invention relates to sampling a domain, and more particularly to importance sampling of partitioned domains.

BACKGROUND

Importance sampling of partitioned domains, where a probability is known for each set of the partition, is used for Monte Carlo and quasi-Monte Carlo methods. Monte Carlo methods are a class of algorithms that rely on repeated random sampling to compute their results. Monte Carlo methods are often used when simulating physical and mathematical systems. Quasi-Monte Carlo methods are similar to Monte Carlo methods, however, instead deterministic samples are used, which can result in an improved convergence.

Quite often, a function is at least in part defined by some discrete energy density, such as a textured light source in computer graphics. To date, the sampling speed for importance sampling of partitioned (or discretized) domains has not been fully optimized. There is thus a need for addressing these and/or other issues.

SUMMARY

A system, method, and computer program product are provided for importance sampling of partitioned domains. In operation, a domain is partitioned into a plurality of sets. Additionally, a probability is assigned to each of the plurality of sets. Furthermore, samples are generated from the plurality of sets, the samples being generated according to the probability of a corresponding set.

BRIEF DESCRIPTION OF THE DRAWINGS

FIG. 7 shows a table illustrating statistics for different probes, in accordance with one embodiment.

DETAILED DESCRIPTION

Figure 1:
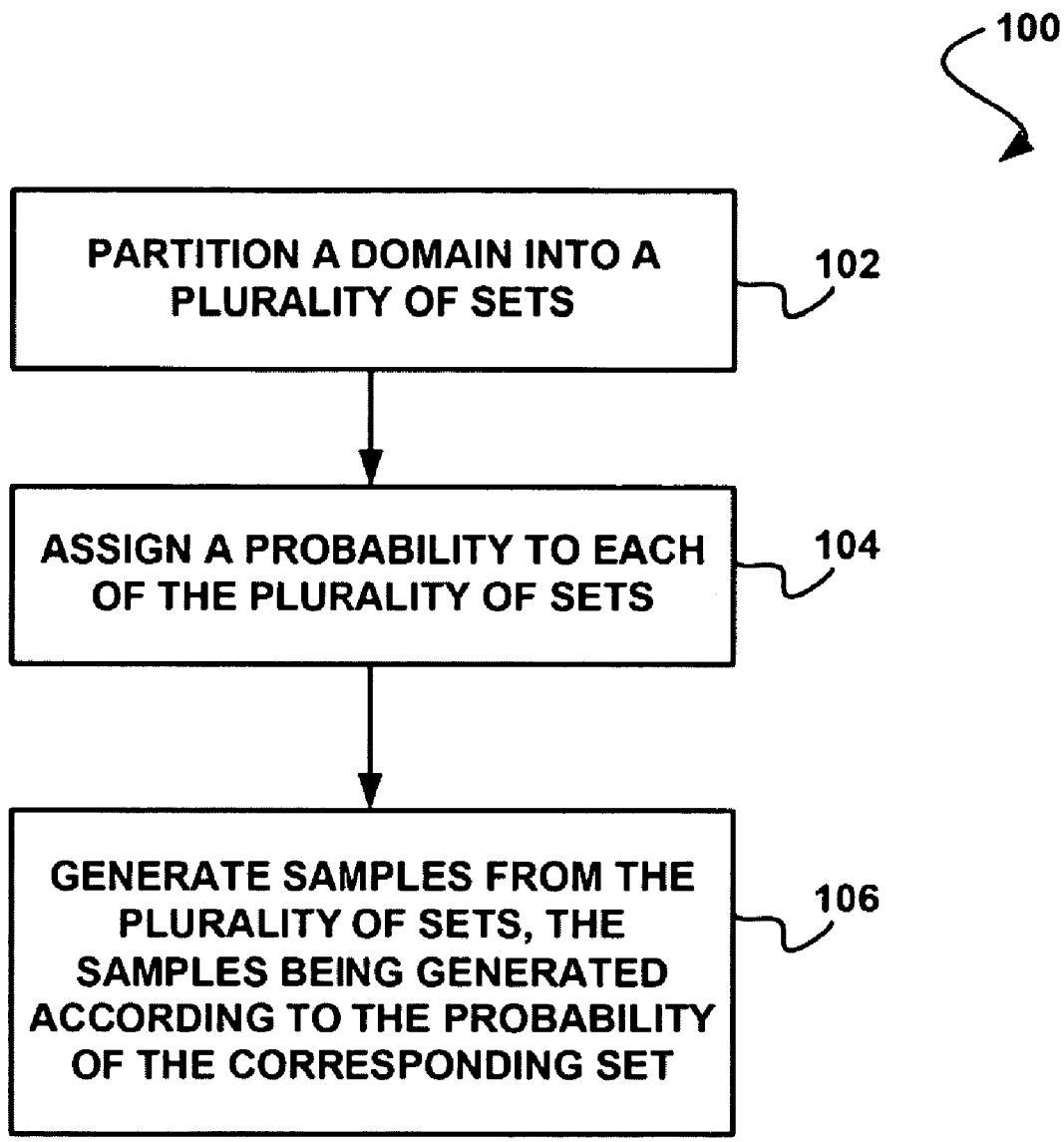
FIG. 1 shows a method for importance sampling of partitioned domains, in accordance with one embodiment.

FIG. 1 shows a method 100 for importance sampling of partitioned domains, in accordance with one embodiment. As shown, a partitioned domain including a plurality of sets is generated. See operation 102. In one embodiment, the partitioned domain may be generated by partitioning a domain into a plurality of sets.

In the context of the present description, a partitioned domain refers to any partitioned object or group of partitioned objects. In one embodiment, the partitioned domain may be an arbitrary-dimensional partitioned domain. Additionally, the partitioned objects may be created by partitioning geometric objects.

In the context of the present description, partitions include voxelizations, where the sets correspond to volume elements (i.e. voxels) that represent a value on a grid in a space of arbitrary dimension. For example, each voxel may be a quantum unit of volume that has a numeric value (or values) associated with it that represents some measurable properties, independent variables, or attribute of an object or phenomenon. Still yet, any voxel may include a voxel or a group of voxels.

Once the partitioned domain including a plurality of sets is generated, a probability is assigned to each of the plurality of sets. See operation 104. Furthermore, samples are generated inside the plurality of sets, the samples being generated according to the probability of the corresponding set. See operation 106.

In one embodiment, the samples may be generated utilizing a data tree. For example, in one embodiment, the data tree may include a Huffman tree. In this case, the Huffman tree may be constructed over the partitioned domain (e.g. utilizing the probability assigned to each of the plurality of sets, etc.).

As an option, the Huffman tree may be traversed down to a single domain cell. In one embodiment, the traversing down may be performed utilizing sample warping. In another embodiment, the traversing down may be performed by generating a random or quasi-Monte Carlo sample at each inner node of the Huffman tree to probabilistically select a child node to access.

As another example, the data tree may include a kd-tree. In this case, the kd-tree may also be constructed over the partitioned domain utilizing the probability assigned to each of the plurality of sets. Furthermore, the kd-tree may be constructed utilizing a heuristic (e.g. a mid-split predictor, an entropy predictor, or a hybrid predictor, etc.). As another option, the constructing of the kd-tree may include reducing a search space for finding a minimum cost function.

In this way, given an arbitrary-dimensional voxelized domain with probabilities assigned to each cell, an arbitrary number of well-distributed samples may be drawn inside the voxel cells according to their probabilities. Both the samples inside voxel cells and samples over the domain as a whole may be well-distributed. As an option, to select domain cells with a small number of expected traversal steps, a Huffman tree may be used. In this case, samples inside the domain cells may be enumerated using a suited low-discrepancy sequence.

In the context of the present description, a low-discrepancy sequence refers to any sequence with the property that for all values of N, its subsequence $x_1, \ldots, x_N$ has a low discrepancy. For example, the low-discrepancy sequence may include a Halton or a Sobol sequence, etc. As another option, to select domain cells with a small number of expected computation steps a kd-tree may be used.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
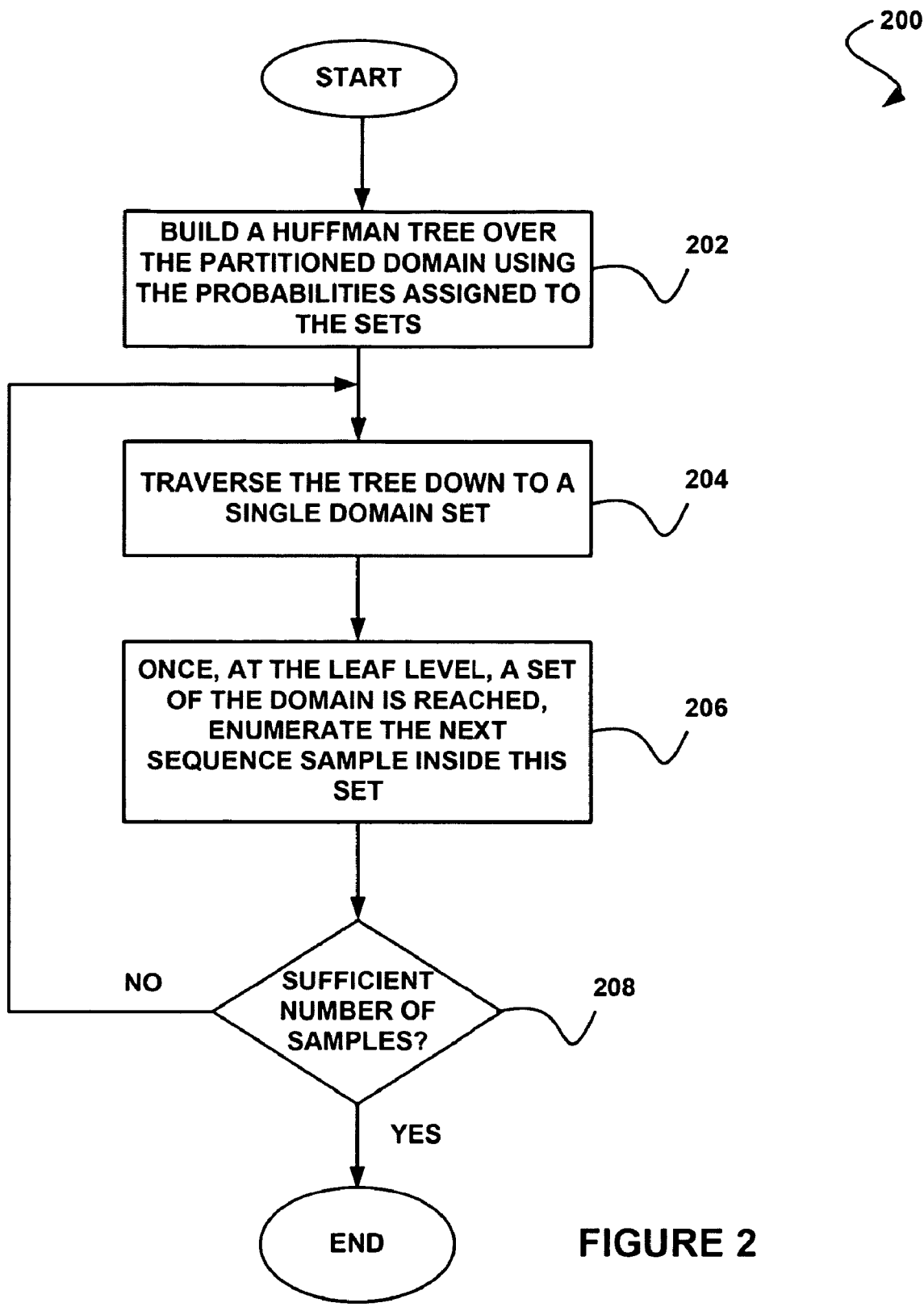
FIG. 2 shows a method for enumerating samples using a Huffman tree, in accordance with another embodiment.

FIG. 2 shows a method 200 for enumerating samples using a Huffman tree, in accordance with another embodiment. As an option, the present method 200 may be implemented in the context of the functionality of FIG. 1. Of course, however, the method 200 may be carried out in any desired environment. It should also be noted that the aforementioned definitions may apply during the present description.

As shown, a Huffman tree is built over a partitioned domain using probabilities assigned to sets. See operation 202. After the Huffman tree is built, the Huffman tree is traversed down to a single domain set. See operation 204.

In one embodiment, traversing the Huffman tree down to a single domain set may be accomplished by sample warping. In another embodiment, traversing the Huffman tree down to a single domain set may be accomplished by drawing a random or quasi random sample at each inner node to probabilistically select the child node to visit next.

Once a set of the domain is reached at the leaf level of the Huffman tree, the next sequence sample is enumerated inside this set. See operation 206. In one embodiment, the next sequence sample may include a Halton sequence sample. In another embodiment, the next sequence sample may include a Sobol sequence sample.

More information regarding enumerating the sequence sample inside a set may be found in U.S. patent application Ser. No. 12/241,928, filed Sep. 30, 2008, entitled "COMPUTER GRAPHICS WITH ENUMERATING QMC SEQUENCES IN VOXELS," which is incorporated herein by reference in its entirety for all purposes.

With either sequence, distribution properties may be obtained by enumerating the quasi-Monte Carlo points directly inside voxels that correspond to the leaf-level of probability trees. Once the next sequence sample is enumerated inside the set, it is determined whether a sufficient number of samples have been drawn. See operation 208.

If a sufficient number of samples have not been drawn, the tree is traversed again and sequence samples are enumerated until a sufficient number of samples have been drawn. In this case, the number of samples that are sufficient may be determined by the system enumerating the samples or an operator thereof.

Figure 3:
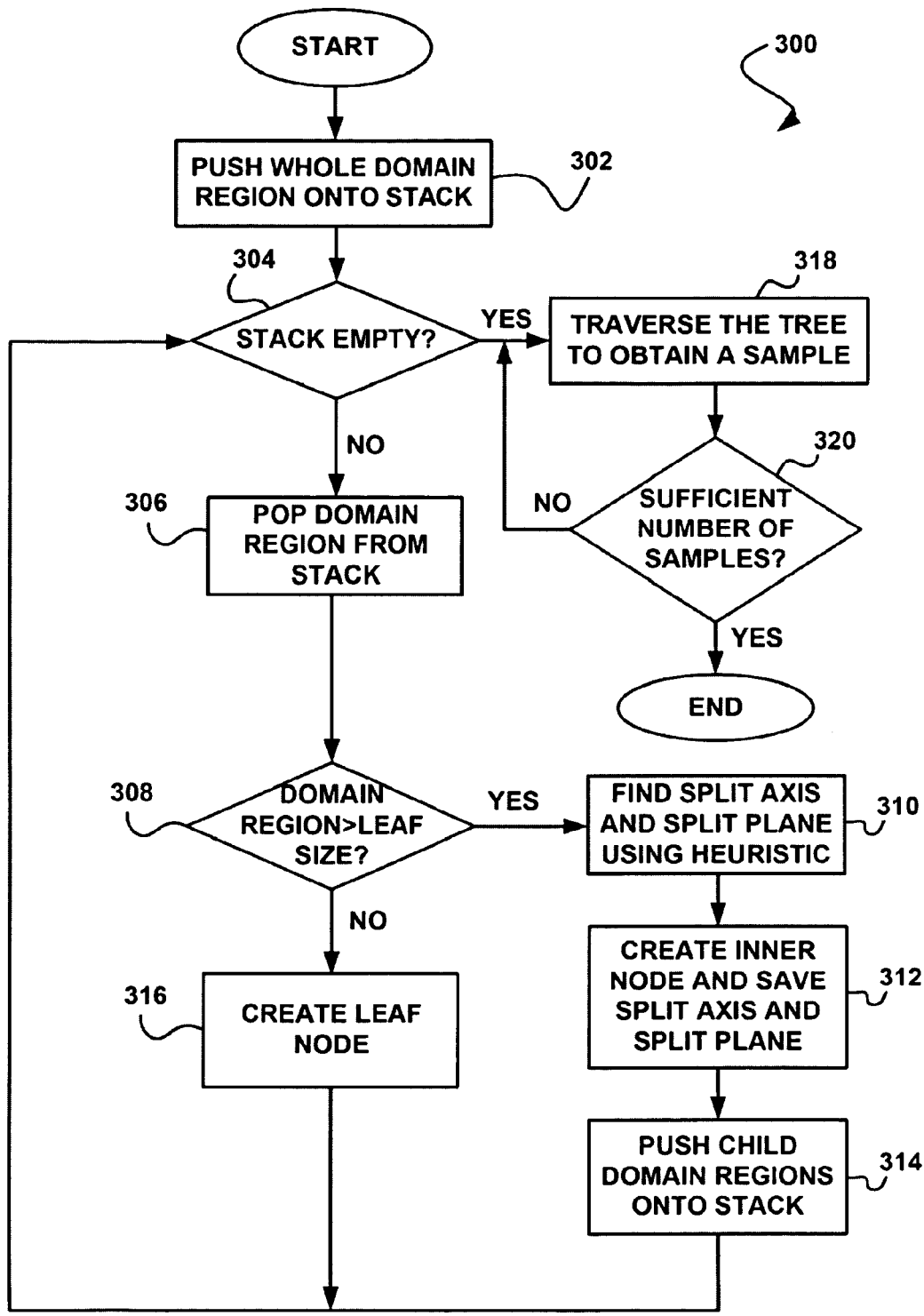
FIG. 3 shows a method for constructing kd-trees with low expected traversal depth and importance sampling for such kd-trees, in accordance with another embodiment.

FIG. 3 shows a method 300 for constructing kd-trees with low expected traversal depth and importance sampling for such kd-trees, in accordance with another embodiment. As an option, the present method 300 may be implemented in the context of the functionality of FIGS. 1-2. Of course, however, the method 300 may be carried out in any desired environment. Again, the aforementioned definitions may apply during the present description.

In operation, a kd-tree may be built over a partitioned domain using the probabilities assigned to sets. First, the whole domain region may be pushed onto a stack. See operation 302. It is then determined whether the stack is empty. See operation 304.

If it is determined that the stack is not empty, the domain region is popped from the stack. See operation 306. It is then determined whether the domain region is greater than the leaf size. See operation 308.

If the domain size is greater than the leaf size, a split axis and split plane are found using a heuristic. See operation 310. In this case, a split-plane may be found at each inner node.

In one embodiment, finding the split-plane at each inner node may include finding a minimum of a cost function inferred from at least one of a mid-split predictor, an entropy predictor, or a hybrid predictor. In one embodiment, finding the split-plane at each inner node may include a reduction of the search space (e.g. by binning, etc.).

Once the split axis and the split plane are found using the heuristic, an inner node is created and the split axis and split plane are saved. See operation 312. The child domain regions are then pushed onto the stack. See operation 314.

If it is determined, in operation 308, that the domain region is not greater than the leaf size, a leaf node is created. See operation 316. It is then again determined if the stack is empty.

If the stack is empty, the kd-tree is traversed to obtain a sample. See operation 318. It is then determined whether a sufficient number of samples have been obtained. See operation 320.

If a sufficient number of samples have not been drawn, the tree is traversed again until a sufficient number of samples have been drawn. In this case, the number of samples that are sufficient may be determined by the system enumerating the samples or an operator thereof.

In this way, kd-trees may be generated that can be used to sample partitioned domains. For generating samples corresponding to voxel probabilities, kd-trees may be generated that have a small number of expected traversal steps in the sample generation stage. Furthermore, in various embodiments, different heuristics may be utilized to generate the trees and perform the sampling. In one embodiment, an entropy based heuristic may be utilized.

Additionally, in another embodiment, samples in voxels may be enumerated based on quasi-Monte Carlo or low discrepancy sequences. In this case, a Huffman-tree may be utilized to select the voxels, as discussed above. Consequently, the expected number of traversal steps for voxel selection may be as low as possible.

In either case, well-distributed sample points may be generated across the partitioned domain, resulting in higher convergence of integral estimations. In one embodiment, such techniques may be utilized in the context of image-based lighting in renderers (e.g. ray-tracing based renderers, etc.), where environment maps are used as a light source. Further applications may include multidimensional particle maps based on voxel cells, volume data visualization, and generally the computation of integrals of multi-dimensional partitioned domains.

Importance sampling of partitioned domains, where a probability, or proximate probability, is known for each voxel, is often a standard technique used for Monte Carlo or quasi-Monte Carlo techniques. Quite often, a function is at least in part defined by some discrete energy density, such as a textured (environment) light source in computer graphics. The sampling speed for importance sampling of discrete domains may be optimized by utilizing probability trees and minimizing the expected traversal depth. In various embodiments, different techniques may be utilized to sample from a discrete domain, either based on the probabilities of the regions or by incorporating spatial connectivity between them.

In one embodiment, cumulative distribution functions (CDFs) may be utilized to select from a discrete set of event. For example, if $p_i$ denotes the probability of the ith event for $i=1,\ldots,n$, the corresponding CDF is constructed inductively as $c_0=0$ and $c_i=c_{i-1}+p_i$ for $i=1,\ldots,n$.

Sampling is then straightforward: a pseudorandom number $\xi \in [0, 1)$ maps to the ith event, if $c_{i-1} \leq \xi < c_i$. Additionally, CDFs used in combination with binary search may also be seen as a 1d-tree using a mid-split construction and specialized traversal where no rescaling is needed. Numerical precision of CDFs is limited by the cumulative sum that may get more and more unstable with increasing number of events. If the events correspond to k-dimensional domains (e.g. voxels in a grid), k new pseudorandom numbers may then be used for stratification inside the voxel.

In another embodiment, a probability tree may be utilized to sample from a discrete set of events. A probability tree is a tree where at each node all children are assigned probabilities. In other words, each node sums up to one for all children. The probability for a leaf is the product of all probabilities encountered on the traversal.

In one embodiment, the optimal probability tree with respect to the expected number of traversal steps may be constructed using a greedy Huffman code algorithm. The algorithm starts with nodes corresponding to the probabilities of single events. Afterwards, the two nodes with the lowest probabilities are successively selected and removed from the pool of nodes. A parent node to these nodes is created, which is assigned the sum of the probabilities of the two children.

This parent node is inserted into the pool of nodes. The algorithm terminates when there is only one node left in the pool, which is the root node of the tree. As an option, the selection of nodes with the lowest probability may be efficiently implemented using a priority queue. The pseudo-code for a Huffman tree construction algorithm is shown in Table 1, in accordance with one embodiment.

TABLE 1

```
Node huffman (double p₁, ..., double pₙ)
{
    // use a heap as priority queue,
    // initialize it with leaf nodes
    Heap heap = heapify (Node(p₁), ..., Node(pₙ))
    while (heap.size ( ) > 1)
    {
        Node node1 = heap.extract_min ( );
        Node node2 = heap.extract_min ( );
        Node parent;
        parent.left = node1;
        parent.right = node2;
        parent.prob = node1.prob + node2.prob;
        heap.insert (parent);
    }
    Return heap
}
```

The average code word length $l(p_1, \ldots, p_n)$ of a Huffman code (which corresponds to the expected number of traversal steps) is bounded by $H(p_1, \ldots, p_n) \leq l(p_1, \ldots, p_n) \leq H(p_1, \ldots, p_n)+1$, where $$H(p_1, \ldots, p_n) := \sum_{i=1}^{n} p_i$$

$\log_2 p_i$ is the entropy.

The case where the branching factor of the probability tree is up to b (i.e. each node has up to b children), an analogous result applies. The Huffman algorithm then selects the b nodes with lowest probabilities. Consequently, the $\log_2$ is to be replaced by a $\log_b$, decreasing the expected traversal depth by a constant factor of $\log_2(b)$.

A kd-tree is a space partitioning tree for data in k dimensions, where all the split planes are axis-aligned. As an option, the kd-tree may be a binary tree. At each node of the tree, exactly one dimension may be split at a specific position along the according axis, which may be stored in the node. In case of a probability kd-tree, this position may correspond to the probability of the left child.

In general, kd-trees are a restriction of general probability trees where spatial connectivity is preserved. However, this spatial connectivity may be exploited. One version of a kd-tree construction is a mid-split tree. Using a mid-split tree, the longest axis is split in the middle. Table 2, shows algorithm for splitting a k-dimensional region defined by the minimum $x_0 = (x_0^{(0)}, \ldots, x_0^{(k-1)})$ and the maximum $x_1 = (x_1^{(0)}, \ldots, x_1^{(k-1)})$ (with $x_0^{(i)} < x_1^{(i)}$ for $i=0, \ldots, k-1$) along the axis of longest extent, in accordance with one embodiment.

TABLE 2

```
void split (x₀ , x₁)
{
    int Δ[k] = x₁-x₀;
    if (Δ == (1,...,1))
    {
        // create a leaf node
        process_leaf (x₀);
    }
    else
    {
        // find axis of longest extent
        int t = argmax Δ⁽ⁱ⁾
                0≤i<k
        int s = (x₀⁽ᵗ⁾ + x₁⁽ᵗ⁾)/ 2;
        // process children recursively
        split (x₀,(x₀⁽⁰⁾, ..., x₁⁽ᵗ⁻¹⁾,s,x₁⁽ᵗ⁺¹⁾, ... x₁⁽ᵏ⁻¹⁾));
        split ((x₀⁽⁰⁾, ..., x₀⁽ᵗ⁻¹⁾,s,x₀⁽ᵗ⁺¹⁾, ... x₀⁽ᵏ⁻¹⁾),x₁);
    }
}
```

For a mid-split kd-tree, the expected traversal depth $l(p_1, \ldots, p_n)$ is bounded by $\log_2(n) \leq l(p_1, \ldots, p_n) < \log_2(n)+1$. It should be noted that for $p_i = 1/n$ ($i=1, \ldots, n$), these bounds are equivalent to $H(p_1, \ldots, p_n) \leq l(p_1, \ldots, p_n) \leq H(p_1, \ldots, p_n)+1$, described above. Therefore, the resulting probability tree is close to optimal. If areas have zero probability, these areas may be removed from tree creation and the corresponding trees are shallower.

Different techniques may be implemented to use a given probability tree for importance sampling. If the leaves in the probability tree correspond to k-dimensional voxels, at least k pseudorandom numbers may be used for sampling. Furthermore, the tree may be traversed in a probabilistic manner. In other words, a child may be chosen according to its probability. In some cases, a straightforward approach of using one pseudorandom number per child decision is not an option, since generating the pseudorandom numbers is expensive and up to d numbers are necessary, where d denotes the maximum leaf depth of the tree.

Another approach is to use only one pseudorandom number for the complete traversal. For each traversal step, the probabilities $p_l$ and $p_r$, with $p_l+p_r=1$, of the left and right child are used for choosing the child to traverse. In this case, $\xi \in [0, 1)$ may denote the current sample. If $\xi < p_l$, the left child is chosen and the sample is rescaled to $\xi' = \xi/p_l$. Otherwise, the right child may be selected and the sample may be rescaled to $\xi' = (\xi-p_l)/p_r$.

In the next traversal step, $\xi' \in [0, 1)$ is used as the pseudorandom sample. Using this scheme, one component of a sample stratified in k+1 dimensions can be used for traversal, while the remaining k components yield a good stratification inside the voxel. In this case, a certain amount of precision may be lost at each rescaling event.

In order to increase the numerical precision, more than one pseudorandom number may be used (e.g. k for a kd-tree, one per dimension, etc.). Then, the split axis of each node may determine which pseudorandom number is rescaled.

In some cases, decoupling the voxel sampling from tree traversal may scramble the mapping from the unit hypercube to the complete domain. In other words, the mapping may be arbitrary and may not preserve spatial proximity of the samples. Regarding the sampling of an environment map, the stratification properties of the point set apply to a pixel, but not the environment map as a whole.

In case of classic Monte Carlo sampling, this is generally not an issue, since the randomness stays the same. However, for quasi-Monte Carlo sequences this may lead to degraded performance or more artifacts.

In order to be able to exploit the stratification properties of certain point sets, those properties may be preserved during mapping the values from $[0, 1)^k$ to the transformed domain represented by the importance sampling scheme. Contrary to general probability trees, kd-trees preserve parts of the spatial connectivity, which may be exploited during sampling. One popular algorithm to traverse kd-trees for importance sampling while still keeping stratification properties of the points is sample warping.

A sample warping algorithm uses the original point set for both traversing and stratification in the voxel by smart rescaling. One example of a sample warping algorithm for a binary kd-tree is shown in Table 3.

TABLE 3

```
void warp_sample (double ξ[k], Node n)
{
    // traverse tree
    while (n is not leaf)
    {
        int axis = n.axis;
        double ξ_s = ξ [axis];
        if (ξ_s < node.p_1)
        {
            ξ_s /= node.p_1;
            n = n.left;
        }
        else
        {
            ξ_s = (ξ_s − node.p_1) / (1.0 − node.p_1);
            n = n.right;
        }
        ξ [axis] = ξ_s;
    }
    // set final position in leaf
    for (int i = 0 ; i < k; ++i)
        ξ [i] = node.min [i] + node.size [i]* ξ [i];
}
```

The algorithm outlined in Table 3 is implemented such that positions for a leaf are stored. In another embodiment, the inner nodes may store the position for the split axis only and that could be used to directly transform to the desired range.

However, if k>1, the mapping may be discontinuous and some useful properties (e.g. minimum distance, etc.) may be lost. Furthermore, the rescaling process may suffer from severe bit-loss if the tree is deep. In general, the algorithms perform well for common resolution voxelizations and are useful for progressive quasi-Monte Carlo integration.

In some cases, very good distribution properties may be obtained by enumerating the quasi-Monte Carlo points or low discrepancy sequences directly inside voxels that correspond to the leaf-level of probability trees. In one embodiment, the Halton or Sobol low discrepancy sequence algorithms may be utilized for this task (including all previous sampling tasks described thus far).

First, a voxel may be chosen according to its probability. This is possible using stratified random sampling over the traversal dimensions. After the voxel has been selected, the next quasi-Monte Carlo point for the voxel is generated. This may require storing the number of previously generated samples inside each voxel.

The result of this scheme may be compared with generating a very dense quasi-Monte Carlo sample set over the whole domain and then selectively thinning out regions according to their probability, similar to rejection sampling. This algorithm may be utilized on any probability tree and not only kd-trees. For example, the algorithm may be utilized on the Huffman tree, which in some cases may be optimal regarding the number of expected traversal steps. This is possible as the algorithm does not rely on spatial connectivity of tree node regions. Therefore, selecting the voxel where to generate the next sample is as fast as theoretically possible.

However, in order to stratify over the traversal dimensions, the number of samples or the number of samples for each pass should be known in advance. Additionally, in some cases, it may be hard to integrate this scheme into a full-featured quasi-Monte Carlo estimator that needs to generate additional sample components. Since sampling a domain might only represent a small part of the whole system, certain instances (i.e. indices of the quasi-Monte Carlo or low discrepancy sequence) might have been used before.

When a different instance is then used for enumerating the next sample inside the voxel, correlation artifacts may appear. Furthermore, it may be unclear which instance should be used to generate additional sample components afterwards.

For an arbitrary subtree T, $T_l$ may be defined to be the left child subtree and $T_r$ to be the right child subtree, respectively. The expected number of traversal steps for T, denoted by E[T], may be recursively written as $E[T]=1+p_l \cdot E[T_l]+p_r \cdot E[T_r]$, where $p_l$ and $p_r$ are the probabilities of the sub-trees.

An exhaustive recursive search over all possible splits via backtracking may be possible for very moderate domain sizes and dimensions. Dynamic programming allows finding the optimal kd-tree to be solved by using a table to store the expected traversal length of all possible subtrees. Beginning at the leaf level, the expected number of traversal steps may be evaluated by iterating over all possible split planes and finding the minimum of $E[T]=1+p_l \cdot E[T_l]+p_r \cdot E[T_r]$, while looking up $E[T_l]$ and $E[T_r]$ in the table, since they have already been computed.

The memory requirement and computational effort of this technique is $O(r_1^2 \ldots r_k^2)$, where $r_i$ is the resolution along dimension i. In some cases, this may only be feasible for small resolutions and small dimensions. Therefore, the split may be determined based on using only local information derived from domain size and probability.

In one embodiment, it may be assumed that both children are constructed using a mid-split predictor heuristic. As the value E[T] can be analytically expressed for a mid-split kd-tree, $\lceil \log_2 m(T) \rceil$, where m(T) is the number of leaves in T, it can be computed.

Using these values as a predictor for the real expected traversal depth, a heuristic may be provided to choose a split plane using only probability and domain size, as shown in Expression 1.

$$E[T] \approx 1+p_l \cdot \lceil \log_2 m(T_l) \rceil + p_r \cdot \lceil \log_2 m(T_r) \rceil \quad \text{Expression 1}$$

In some cases, employing the heuristic shown in Expression 1 may yield slightly better kd-trees than a mid-split heuristic. As another option, a simpler heuristic may be utilized. Expression 2 shows an example of another heuristic, in accordance with one embodiment.

$$E[T] \approx 1+p_l \cdot m(T_l)+p_r \cdot m(T_r) \quad \text{Expression 2}$$

In another embodiment, a heuristic based on the entropy of the subtrees may be utilized. For example, if Huffman trees were created for both children, then the expected traversal depth may be estimated as shown in Expression 3, where $H(T_l)$ and $H(T_r)$ are the entropy of the leaves in the left and right subtree, respectively.

$$E[T] \approx 1 + p_l \cdot H(T_l) + p_r \cdot H(T_r) \quad \text{Expression 3}$$

Depending on the distribution of probabilities in a subtree the improvement with respect to expected traversal depth might not be worth the effort. Especially in the case where there is almost equal distribution in a region, a mid-split may be close to optimal.

The entropy of a region yields a very powerful measure on how promising a more expensive heuristic may be. A criterion may be applied based on comparing the maximum entropy $\lceil \log_2 m(T) \rceil$ with $H(T)$. For example, the more expensive entropy predictor heuristic may be applied if $H(T) < c \cdot \lceil \log_2 m(T) \rceil$, where $c<1$ is a user-controlled threshold factor, and perform a simple mid-split otherwise. In this way, effort may be invested where performance is most promising. In another embodiment, the optimal kd-tree may be built on a down-sampled version of an image, the simpler heuristic may be used on the highest levels of the resulting tree, subsequently switching to the full-resolution input.

To evaluate the probability and entropy for arbitrary regions of the domain, a summed-area table (SAT) may be used. As an option, such a summed-area table may be constructed rapidly in parallel using the scan primitive of current graphic processing units (GPUs).

In most cases, the entropy is defined for a set of probabilities $p_i$, with $\Sigma_i p_i = 1$. For arbitrary regions of the domain, the probabilities may be renormalized using the constant factor $s := 1/\Sigma_i p_i$. The SAT may be used for the entropy values since:

$$\begin{aligned} H &= -\sum_i (p_i \cdot s) \cdot \log_2(p_i \cdot s) \\ &= -s \sum_i p_i \cdot (\log_2 p_i + \log_2 s) \\ &= -s \sum_i p_i \cdot \log_2 p_i - s \cdot \log_2 s \sum_i p_i \\ &= -s \sum_i p_i \cdot \log_2 p_i - \log_2 s. \end{aligned}$$

Both the values $1/s = \Sigma_i p_i$ and $\Sigma_i p_i \cdot \log_2 p_i$ can be retrieved from their respective SATs.

If one sample number is used for all traversal steps by rescaling, the precision loss should be taken into account. As an example, a probability midsplit in a binary tree may be considered, where both children have a probability of 0.5 at all nodes. A traversal with one pseudo-random number may lead to a bit loss of exactly one bit per traversal step.

A common environment map, for example, may have a resolution of 1024×1024, leading to a tree of a depth of about 20. In this scenario, at least 20 bits may be lost during traversal, essentially reducing a double precision to a single precision floating point number.

Similar precision issues have to be taken into account if the sample warping algorithm is employed. In that scenario, one sample number may be used for each dimension of the kd-tree and the bits left over from traversing may be used to place the sample into the leaf, reducing the precision in a leaf. Of course, in case of an additional transformation in place to map from the voxels to the real domain (e.g. for longitude/latitude environment maps, etc.), the prediction of bit-loss may be more complicated.

However, double precision floating point may be precise enough for the sample warping algorithm to be successfully employed. Reducing the number of expected traversal steps may reduce the average bit loss.

It should be noted that, in one embodiment, a row/column SAT may be employed. Using a row/column SAT, look-up operations may be saved per probability/entropy evaluation, since each axis is traversed during the full entropy predictor heuristic computation.

Additionally, because the leaf probabilities are usually small, and exact values are not depended upon, a fast, approximate $\log_2$ implementation for floating-point numbers, may be utilized.

The inner nodes may be rescaled in a way that only a single "split plane" is stored and the decision for the next child simplifies to a less than comparison, analogous to CDFs. Because the interval of possible samples for each node is known, the split plane inside this interval may be computed according to the probabilities of the children, as shown by Expression 4, where s denotes the split position, $[I_0, I_1)$ denotes the interval of possible samples at the current node, and $p_l$ and $p_r$ denote the (unnormalized) probabilities of the children.

$$s := I_0 + (I_1 - I_0) \cdot \frac{p_l}{p_l + p_r} \quad \text{Expression 4}$$

Each leaf may then store the $I_0$ and the factor $1/(I_1-I_0)$ to correctly rescale the sample to $[0, 1)$. In this way, there is only a single subtraction and multiplication per sample dimension for a full traversal.

As another option, monotony in the cost function may be assumed along an axis. Although this may not be the case, a local minimum may not be worse than a global minimum. Starting at the mid-split and then successively going to the left or right until the cost functions starts to rise, and then taking the minimum found may allow for the minimum search to be aborted the minimum earlier. Still yet, in one embodiment, binning may be used to reduce the number of cost function evaluations.

Figure 4:
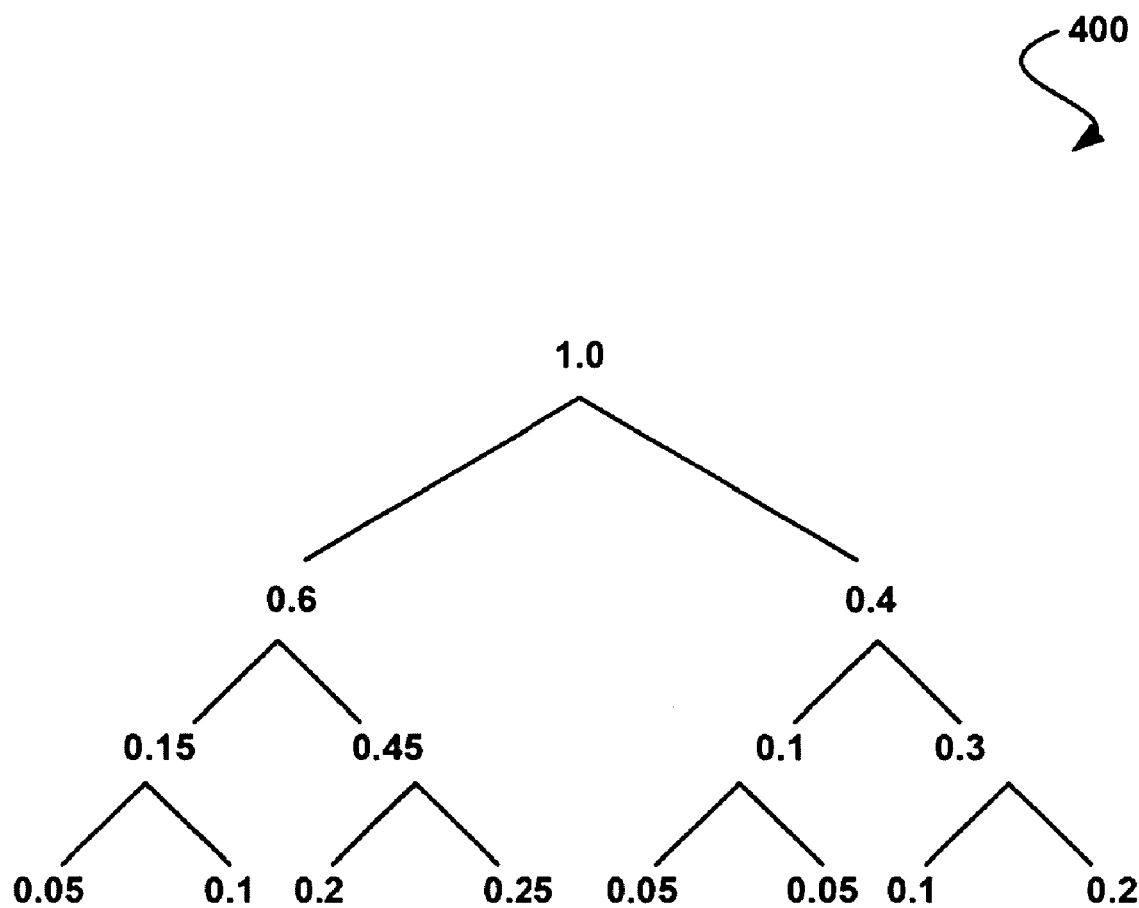
FIG. 4 shows a probability tree, where inner nodes hold the sum of the probabilities of their children, in accordance with one embodiment.
Figure 5:
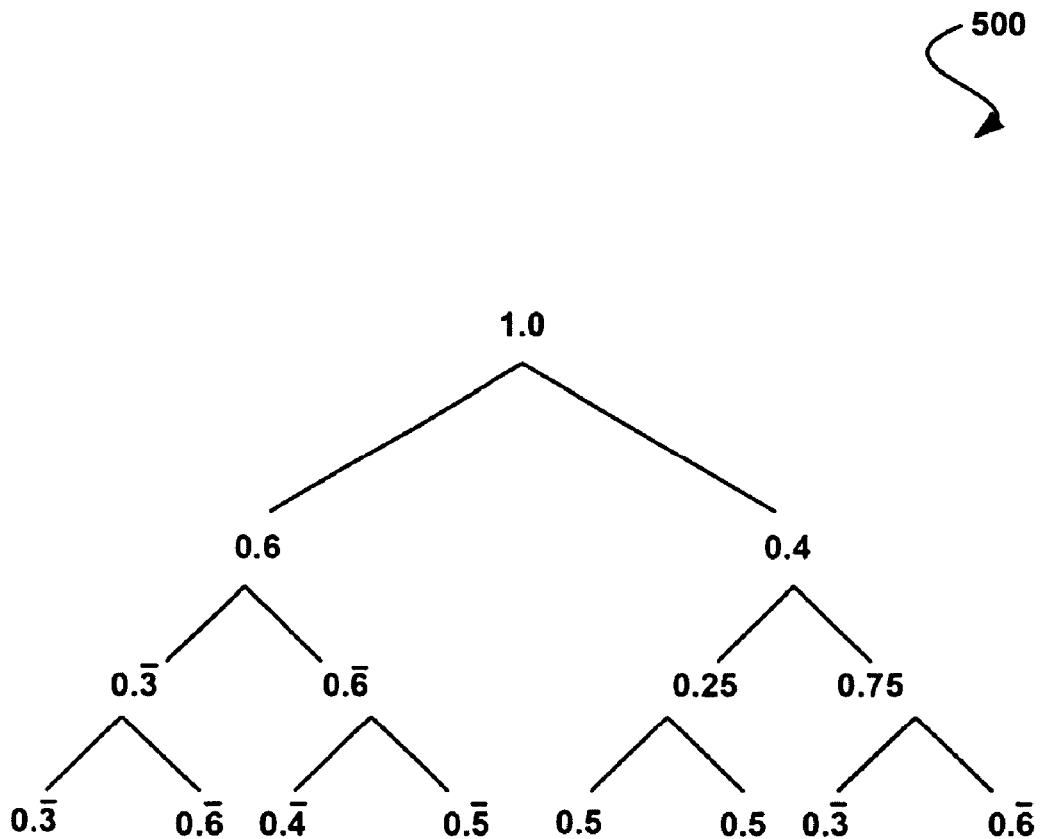
FIG. 5 shows a decision tree corresponding to FIG. 4 that may be used for sample warping, in accordance with one embodiment.
Figure 6:
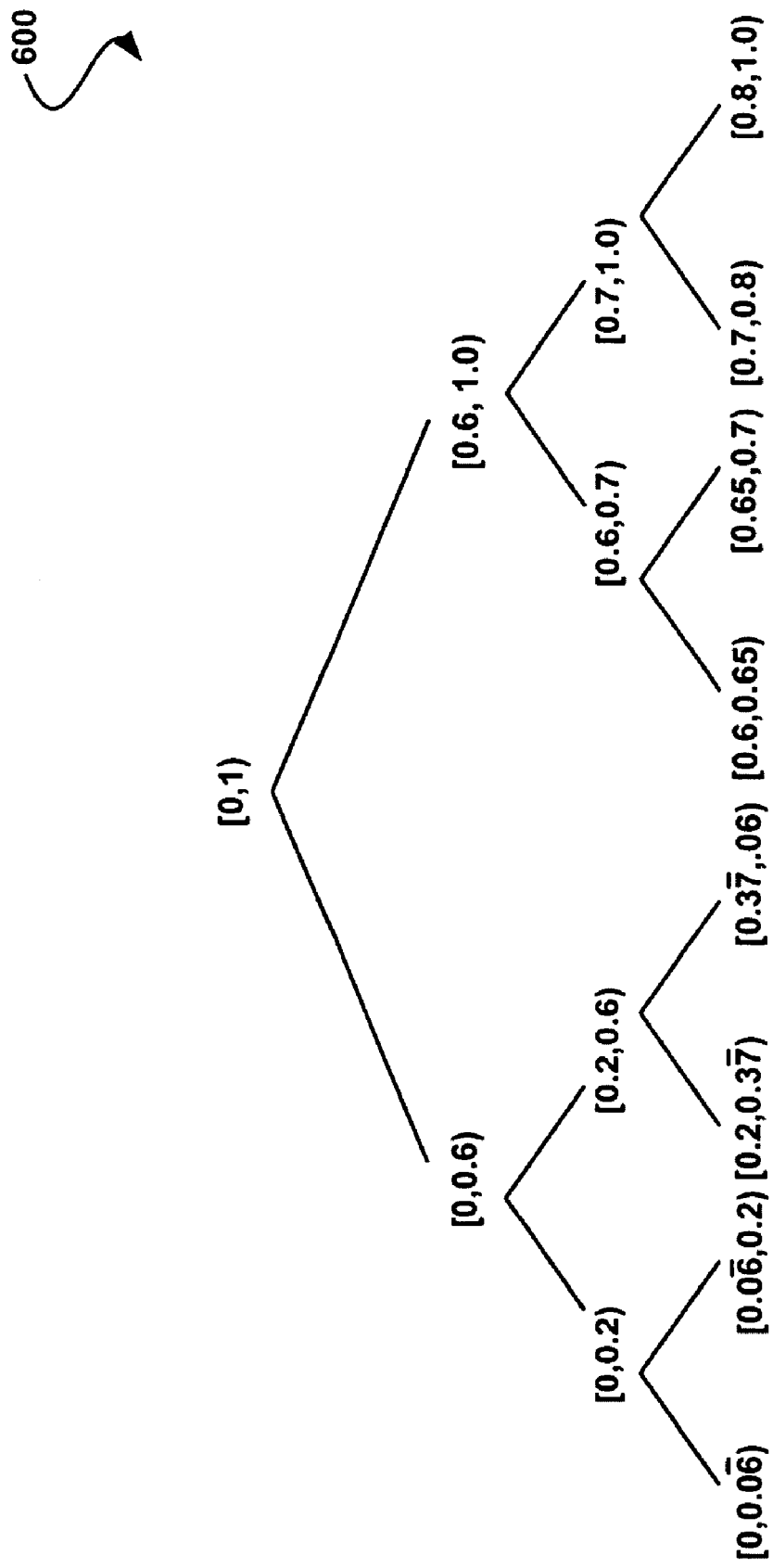
FIG. 6 shows a tree of sample intervals for each node corresponding to FIG. 5, when 1d-sample warping is used, in accordance with one embodiment.

FIG. 4 shows a probability tree 400, where inner nodes hold the sum of the probabilities of their children, in accordance with one embodiment. FIG. 5 shows a decision tree 500 corresponding to FIG. 4 that may be used for sample warping, in accordance with one embodiment. FIG. 6 shows a tree 600 of sample intervals for each node corresponding to FIG. 5, when 1d-sample warping is used, in accordance with one embodiment. For the fast sample warping technique, the split planes may be set to the center of these intervals.

FIG. 7 shows a table 700 illustrating statistics for different probes, in accordance with one embodiment. As an option, the table 700 may be viewed in the context of the functionality and architecture of FIGS. 1-6. Of course, however, the table 700 may be viewed in the context of any desired environment. It should also be noted that the aforementioned definitions may apply during the present description.

The table 700 shows statistics for different probes of size 64×32. In this example, the random image utilized is made of random uniform pixels, while the starfield image includes some random pixels that are much brighter than the background. For a comparison, the table 700 shows statistics employing various tree constriction algorithms for a series of high dynamic range images as for image based lighting. As an option, 3d-trees may be used when an environment map is a HDR video and the shutter time of a single rendered image spans over multiple frames in the video. Environment rays would then feature time instants where the illumination contributes most.

Figure 8:
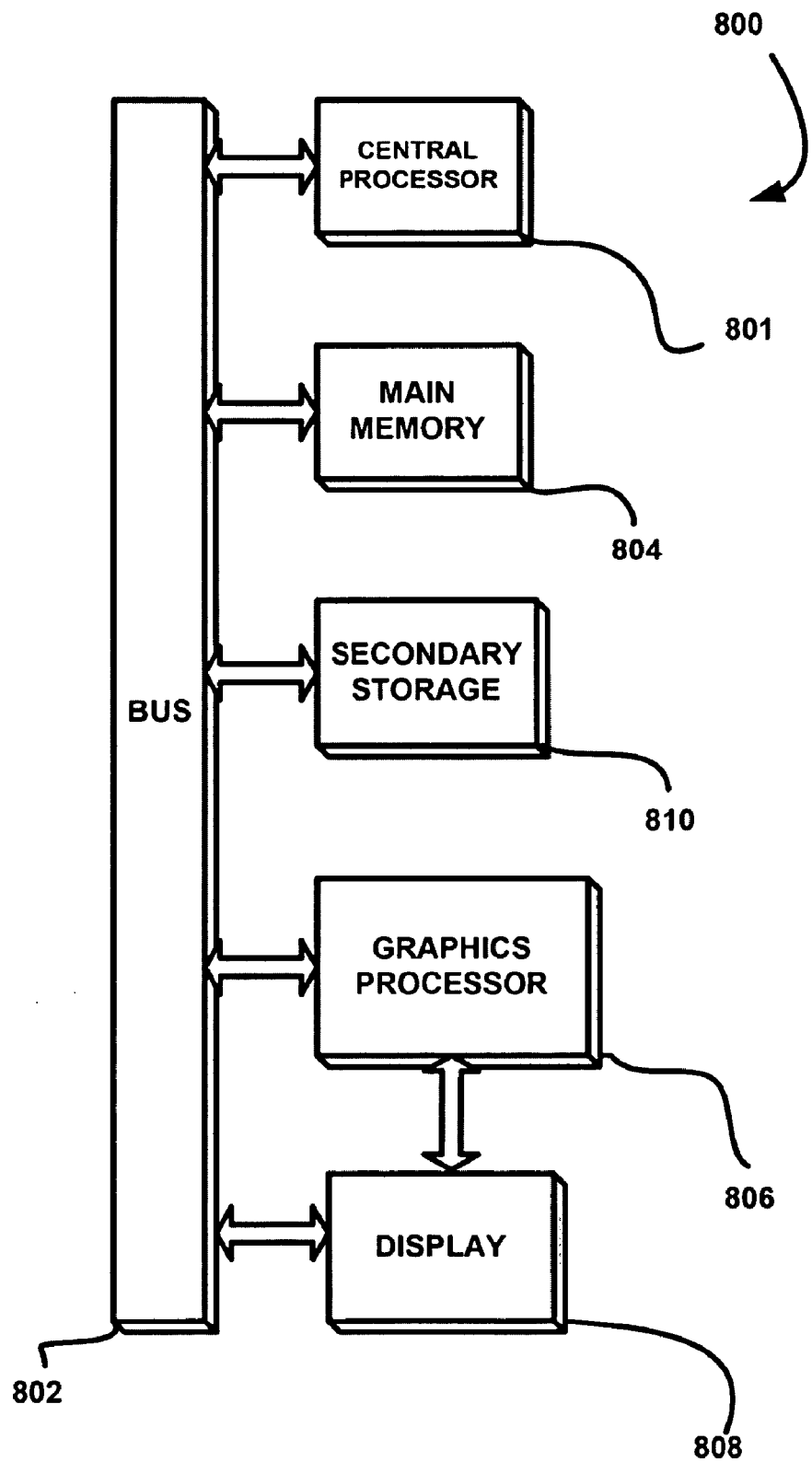
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one host processor 801 which is connected to a communication bus 802. The system 800 also includes a main memory 804. Control logic (software) and data are stored in the main memory 804 which may take the form of random access memory (RAM).

The system 800 also includes a graphics processor 806 and a display 808, i.e. a computer monitor. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make-substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804 and/or the secondary storage 810. Such computer programs, when executed, enable the system 800 to perform various functions. Memory 804, storage 810 and/or any other storage are possible examples of computer-readable media.

In one embodiment, the architecture and/or functionality of the various previous figures may be implemented in the context of the host processor 801, graphics processor 806, an integrated circuit (not shown) that is capable of at least a portion of the capabilities of both the host processor 801 and the graphics processor 806, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, lap-top computer, and/or any other type of logic. Still yet, the system 800 may take the form of various other devices including, but not limited to, a personal digital assistant (PDA) device, a mobile phone device, a television, etc.

Further, while not shown, the system 800 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    partitioning a domain, utilizing a processor, into a plurality of sets;
    assigning a probability to each of the plurality of sets;
    constructing a tree over the partitioned domain utilizing the probability assigned to each of the plurality of sets;
    selecting a subtree from the tree, the selected subtree having a left subtree and a right subtree;
    calculating an entropy of at least one leaf of the left subtree of the selected subtree;
    calculating an entropy of at least one leaf of the right subtree of the selected subtree;
    calculating an expected number of traversal steps for the selected subtree as a function of a probability of the left subtree, a probability of the right subtree, the entropy of the at least one leaf of the right subtree, and the entropy of the at least one leaf of the left subtree;
    splitting the selected subtree into at least two portions based on the calculated expected number of traversal steps, wherein the selected subtree is split into the at least two portions in response to a determination that a total entropy is less than a predetermined maximum entropy, the total entropy including a sum of an entropy of all of the leaves of the left subtree of the selected subtree and an entropy of all of the leaves of the right subtree of the selected subtree; and
    traversing at least one of the at least two portions of the selected subtree by generating samples from the plurality of sets, the samples being generated according to the probability of a corresponding set.

2. The method of claim 1, wherein the samples are generated utilizing the tree.

3. The method of claim 2, wherein the tree includes a Huffman tree.

4. The method of claim 3, further comprising enumerating the samples using a low discrepancy sequence.

5. The method of claim 2, wherein the tree includes a kd-tree.

6. The method of claim 5, wherein the kd-tree is constructed over the partitioned domain utilizing the probability assigned to each of the plurality of sets.

7. The method of claim 6, wherein the kd-tree is constructed utilizing a heuristic.

8. The method of claim 1, wherein the calculation of the expected number of traversal steps for the selected subtree includes calculating a product of the probability of the left subtree and the entropy of all of the leaves of the left subtree, summed with a product of the probability of the right subtree and the entropy of all of the leaves of the right subtree.

9. A computer program product embodied on a non-transitory computer readable medium, comprising:
    computer code for partitioning a domain into a plurality of sets;
    computer code for assigning a probability to each of the plurality of sets;
    computer code for constructing a tree over the partitioned domain utilizing the probability assigned to each of the plurality of sets;

computer code for selecting a subtree from the tree, the selected subtree having a left subtree and a right subtree;

computer code for calculating an entropy of at least one leaf of the left subtree of the selected subtree;

computer code for calculating an entropy of at least one leaf of the right subtree of the selected subtree;

computer code for calculating an expected number of traversal steps for the selected subtree as a function of a probability of the left subtree, a probability of the right subtree, the entropy of the at least one leaf of the right subtree, and the entropy of the at least one leaf of the left subtree;

computer code for splitting the selected subtree into at least two portions based on the calculated expected number of traversal steps, wherein the computer program product is operable such that the selected subtree is split into the at least two portions in response to a determination that a total entropy is less than a predetermined maximum entropy, the total entropy including a sum of an entropy of all of the leaves of the left subtree of the selected subtree and an entropy of all of the leaves of the right subtree of the selected subtree; and computer code for traversing at least one of the at least two partitions of the selected subtree by generating samples from the plurality of sets, the samples being generated according to the probability of a corresponding set.

10. An apparatus, comprising: a processor for:

partitioning a domain into a plurality of sets, assigning a probability to each of the plurality of sets, constructing a tree over the partitioned domain utilizing the probability assigned to each of the plurality of sets, selecting a subtree from the tree, the selected subtree having a left subtree and a right subtree, calculating an entropy of at least one leaf of the left subtree of the selected subtree, calculating an entropy of at least one leaf of the right subtree of the selected subtree, calculating an expected number of traversal steps for the selected subtree as a function of a probability of the left subtree, a probability of the right subtree, the entropy of the at least one leaf of the right subtree, and the entropy of the at least one leaf of the left subtree, splitting the selected subtree into at least two portions based on the calculated expected number of traversal steps, wherein the processor is operable such that the selected subtree is split into the at least two portions in response to a determination that a total entropy is less than a predetermined maximum entropy, the total entropy including a sum of an entropy of all of the leaves of the left subtree of the selected subtree and an entropy of all of the leaves of the right subtree of the selected subtree, and traversing at least one of the at least two portions of the selected subtree by generating samples from the plurality of sets, the samples being generated according to the probability of a corresponding set.

11. The computer program product of claim 9, wherein the samples are generated utilizing the tree.

12. The computer program product of claim 11, wherein the tree includes a Huffman tree.

13. The computer program product of claim 12, further comprising enumerating the samples using a low discrepancy sequence.

14. The computer program product of claim 11, wherein the tree includes a kd-tree.

15. The computer program product of claim 14, wherein the kd-tree is constructed over the partitioned domain utilizing the probability assigned to each of the plurality of sets.

16. The computer program product of claim 15, wherein the kd-tree is constructed utilizing a heuristic.

17. The apparatus of claim 10, wherein the samples are generated utilizing the tree.

18. The apparatus of claim 17, wherein the tree includes a Huffman tree.

19. The apparatus of claim 18, further comprising enumerating the samples using a low discrepancy sequence.

20. The apparatus of claim 17, wherein the tree includes a kd-tree.

21. The apparatus of claim 20, wherein the kd-tree is constructed over the partitioned domain utilizing the probability assigned to each of the plurality of sets.

\* \* \* \* \*